United States Patent
Nelson et al.

(10) Patent No.: US 10,841,764 B2
(45) Date of Patent: Nov. 17, 2020

(54) METHOD AND APPARATUS FOR VEHICLE TO MOBILE PHONE COMMUNICATION

(71) Applicant: Ford Global Technologies, LLC, Dearborn, MI (US)

(72) Inventors: Thomas Nelson, Plymouth, MI (US); David Anthony Hatton, Berkley, MI (US); Hussein F. Nasrallah, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 864 days.

(21) Appl. No.: 14/729,121

(22) Filed: Jun. 3, 2015

(65) Prior Publication Data

US 2016/0360027 A1 Dec. 8, 2016

(51) Int. Cl.

| | |
|---|---|
| *H04W 4/48* | (2018.01) |
| *G01S 19/12* | (2010.01) |
| *H04L 29/08* | (2006.01) |
| *H04W 4/02* | (2018.01) |
| *H04W 76/11* | (2018.01) |
| *H04M 1/725* | (2006.01) |
| *G01S 19/42* | (2010.01) |
| *G01S 5/00* | (2006.01) |
| *H04W 4/50* | (2018.01) |
| *H04B 1/3822* | (2015.01) |
| *H04M 1/60* | (2006.01) |

(52) U.S. Cl.
CPC .............. *H04W 4/48* (2018.02); *G01S 5/0027* (2013.01); *G01S 19/12* (2013.01); *G01S 19/42* (2013.01); *H04B 1/3822* (2013.01); *H04L 67/12* (2013.01); *H04M 1/7253* (2013.01); *H04W 4/023* (2013.01); *H04W 4/50* (2018.02); *H04W 76/11* (2018.02); *G01S 2205/001* (2013.01); *H04L 67/125* (2013.01); *H04M 1/6075* (2013.01); *H04M 2250/02* (2013.01)

(58) Field of Classification Search
CPC .................................. H04W 4/12; H04W 4/14
USPC ....................................................... 455/413
See application file for complete search history.

(56) References Cited

U.S. PATENT DOCUMENTS

| | | | |
|---|---|---|---|
| 7,725,129 B2 | 5/2010 | Grunhold | |
| 2009/0088192 A1* | 4/2009 | Davis ..................... | G08B 25/08 455/466 |
| 2010/0305807 A1* | 12/2010 | Basir ................... | B60R 16/0373 701/31.4 |

(Continued)

FOREIGN PATENT DOCUMENTS

WO 2007039792 A2 4/2007

*Primary Examiner* — Erin F Heard
*Assistant Examiner* — Donald H B Braswell
(74) *Attorney, Agent, or Firm* — Michael Spenner; Brooks Kushman P.C.

(57) ABSTRACT

A system includes a processor configured to receive a vehicle event and determine a wireless device present connection state relative to a vehicle infotainment system. The processor is further configured to communicate with a remote server through a vehicle modem, including transmission of the wireless device present connection state, based on the occurrence of the vehicle event. The processor may also be configured to request that the remote server instruct a wireless device to pair with a vehicle infotainment system if the wireless device present connection state indicates the wireless device is not presently paired.

14 Claims, 4 Drawing Sheets

(56) References Cited

U.S. PATENT DOCUMENTS

| | | | |
|---|---|---|---|
| 2012/0214472 A1* | 8/2012 | Tadayon | H04B 5/0062 |
| | | | 455/418 |
| 2012/0320824 A1* | 12/2012 | Bari | H04W 76/10 |
| | | | 370/328 |
| 2013/0218412 A1* | 8/2013 | Ricci | G06F 17/00 |
| | | | 701/36 |
| 2013/0267193 A1* | 10/2013 | Hatton | H04W 4/046 |
| | | | 455/404.2 |
| 2013/0309977 A1 | 11/2013 | Heines et al. | |
| 2014/0187149 A1 | 7/2014 | Lortz et al. | |
| 2014/0378055 A1* | 12/2014 | Pal | H04W 8/005 |
| | | | 455/41.2 |
| 2015/0046022 A1 | 2/2015 | Bai et al. | |
| 2015/0141043 A1* | 5/2015 | Abramson | G01C 21/34 |
| | | | 455/456.1 |
| 2015/0170427 A1* | 6/2015 | Hansen | G07C 5/008 |
| | | | 701/31.5 |
| 2016/0007140 A1 | 1/2016 | Yae et al. | |
| 2016/0116293 A1* | 4/2016 | Grover | G01C 21/34 |
| | | | 701/23 |
| 2016/0308743 A1 | 10/2016 | Alam et al. | |

* cited by examiner

METHOD AND APPARATUS FOR VEHICLE TO MOBILE PHONE COMMUNICATION

TECHNICAL FIELD

The illustrative embodiments generally relate to a method and apparatus for communications between a vehicle and a mobile phone.

BACKGROUND

Vehicle telematics services currently provide a wide range of connectivity and interactivity options for users to enjoy. Through wired and wirelessly connected devices, using short-range wireless communication, vehicle occupants can use a vehicle interface, communicating with a mobile device through, for example, USB or BLUETOOTH. This can include communicating with applications on the device, utilizing data from the device (e.g., without limitation turn-by-turn directions) and generally using the device's remote connectivity to the benefit of the vehicle. When a local device is not connected, however, many of these features are not available. Even if a vehicle is equipped with a modem capable of remote communication that can function in the absence of the device, all the functionality obtained through utilization of features installed on the mobile device may be lost.

In one connection example, a vehicle monitoring system includes a hub unit and a plurality of mobile units. Each mobile unit is locatable at a vehicle and the system includes a vehicle modem directly accessible by cellular telephone users via a cellular telephone network and operable to communicate with a remote hub unit via the cellular telephone network. The system also includes a mobile control means operably connected to the vehicle modem and operable, on receipt of an initiating signal from a cellular telephone to actuate a reporting function and to transmit to the remote hub unit data representative of at least one predetermined parameter relating to the vehicle and an identifier of the cellular telephone transmitting the initiating signal. The hub unit includes hub access means operable to access a cellular telephone network. The hub unit also includes a hub controller operably connected to the hub access means, which has data storage means having stored thereon identification and contact details for authorized users of the monitoring system. The hub controller is operable, on receipt of a data transmission from a mobile unit, to ascertain whether the identifier of the cellular telephone that transmitted the initiating signal for the data transmission matches the identification of an authorized user and, if so, to transmit to the authorized user via the cellular telephone network preselected information related to the vehicle in question.

In another connection example, a cell phone based vehicle control system includes a vehicle having an electronic network for the vehicle's electrical devices. A data interface module is serially connected to a central processing module and the electronic network. A transceiver module is serially connected to the central processing module and the data interface module. A cellular telephone communicates wirelessly with the transceiver module. The central processing module includes at least one analog connection for use with non-electronic network equipped vehicles. The data interface module provides data translation between the vehicle's electronic network and the central processing module. The transceiver module and cellular telephone include compatible data encryption/decryption units. The transceiver module includes a Global Positioning System (GPS) unit capable of identifying the location of the vehicle. The cellular telephone operates systems including remote locking, arming/disarming of an alarm system, engine start, panic mode, remote driver specific vehicle adjustments and remote auxiliary command functions.

SUMMARY

In a first illustrative embodiment, a system includes a processor configured to receive a vehicle event. The processor is also configured to determine a wireless device present-connection-state to a vehicle infotainment system. The processor is further configured to communicate with a remote server through a vehicle modem, including transmission of the wireless device present connection state, based on the occurrence of the vehicle event. Also, the processor is configured to request that the remote server instruct a wireless device to pair with a vehicle infotainment system if the wireless device present connection state indicates the wireless device is not presently paired.

In a second illustrative embodiment, a computer-implemented method includes determining a wireless device present connection state to a vehicle infotainment system based on receipt of a vehicle event. The method also includes requesting that a pairing instruction to pair with a vehicle computer be sent to a wireless device through the remote server.

In a third illustrative embodiment, a system includes a processor configured to receive indicia from a vehicle onboard modem that a wireless device is not presently connected to a vehicle infotainment system. The processor is also configured to select a wireless device for cloud-assisted communication with the vehicle infotainment system. The processor is further configured to establish communication with the wireless device and relay communication between the wireless device and the vehicle infotainment system.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
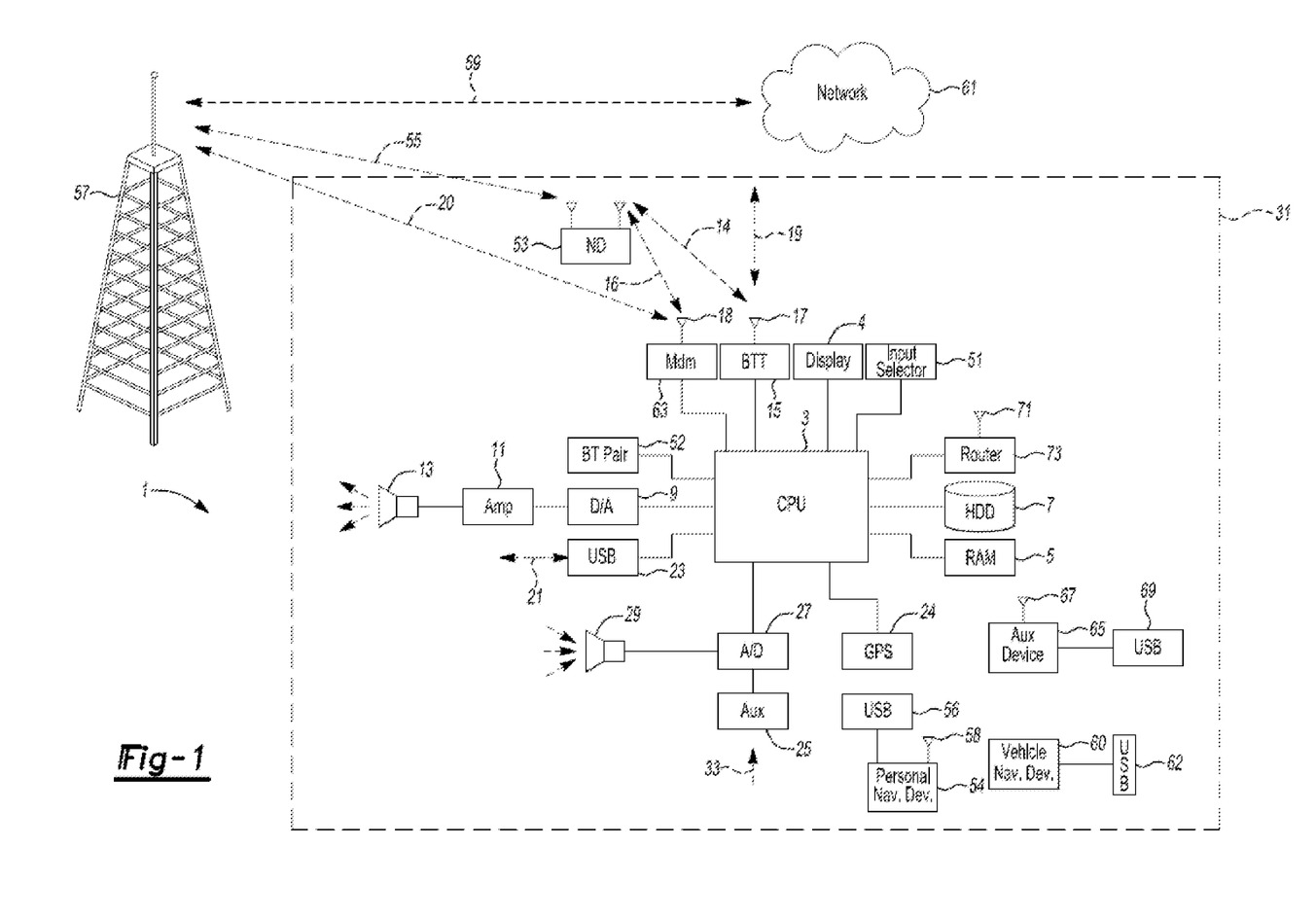
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Representative communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having representative processes executed by a vehicle computing system located in a vehicle, in certain embodiments, the representative processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, a representative, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements or features of the disclosure. Additional steps may be added or removed from the representative processes as desired.

Vehicular telematics units may operate using an on-board modem capable of remote communication, through a transceiver communicating with a mobile device to use the mobile device's remote communication capabilities, or through some combination of both. When connected in a wired or local-wireless manner to a mobile device, the vehicle computer can use both the mobile device remote communication capability (such as accessing the Internet or communicating with a remote server) and can use functionality provided to the mobile device (e.g., without limitation, GPS data, navigation, mobile apps). The connected mobile device can also be used to communicate data about an emergency event, for example, or other vehicle events. If a driver is accustomed to obtaining functionality from the mobile device, when the mobile device is not connected or is unable to connect, the driver may experience some frustration.

The illustrative embodiments propose alternative systems and methods for connecting to a mobile device when a local (e.g., short range) wireless connection is not established.

In at least one example, a device was previously paired with a vehicle and then the driver exited the vehicle (while leaving the vehicle running) and moved outside a pairable range (e.g., walked into a gas station to pay). Upon return to the vehicle, the vehicle may not immediately re-pair the device. This can result in user confusion, because the user may expect the device to immediately reconnect. Through the illustrative examples, events such as, but not limited to, opening a door, sitting in a seat, shifting a vehicle into drive, etc. can result in an instruction sent from the vehicle (indicating the event type) to the cloud, which in turn causes a request from the cloud to be sent to the device to instruct the device to pair with the vehicle. Thus, connection can be seamlessly re-established.

In other examples, the vehicle has an embedded modem that can be used for remote communication in the absence of a wirelessly connected driver/occupant device. The modem is connected to a vehicle controller area network (CAN) or other vehicular network, and can receive signals and instructions from vehicle systems. The modem is also capable of receiving/recording vehicle events transmitted by various vehicular systems. In the illustrative embodiments, when the vehicle's embedded modem records a vehicle event, such as, but not limited to, ignition, a crash event, a diagnostic code, etc., the modem may communicate with a cloud database or web service to record the event. At the same time the event is transmitted, and/or based on the occurrence of the event, the modem can notify the cloud that a local mobile phone or other wireless connectivity device or smart device is not connected to the system. The cloud can then transmit a command to the wireless connectivity device as a push notification, for example, or a data packet to initiate a workflow. Thus, even if the device is not paired through existing protocols, the embedded modem can then use the cloud to communicate with the device indirectly to access and utilize device functionality.

Figure 2:
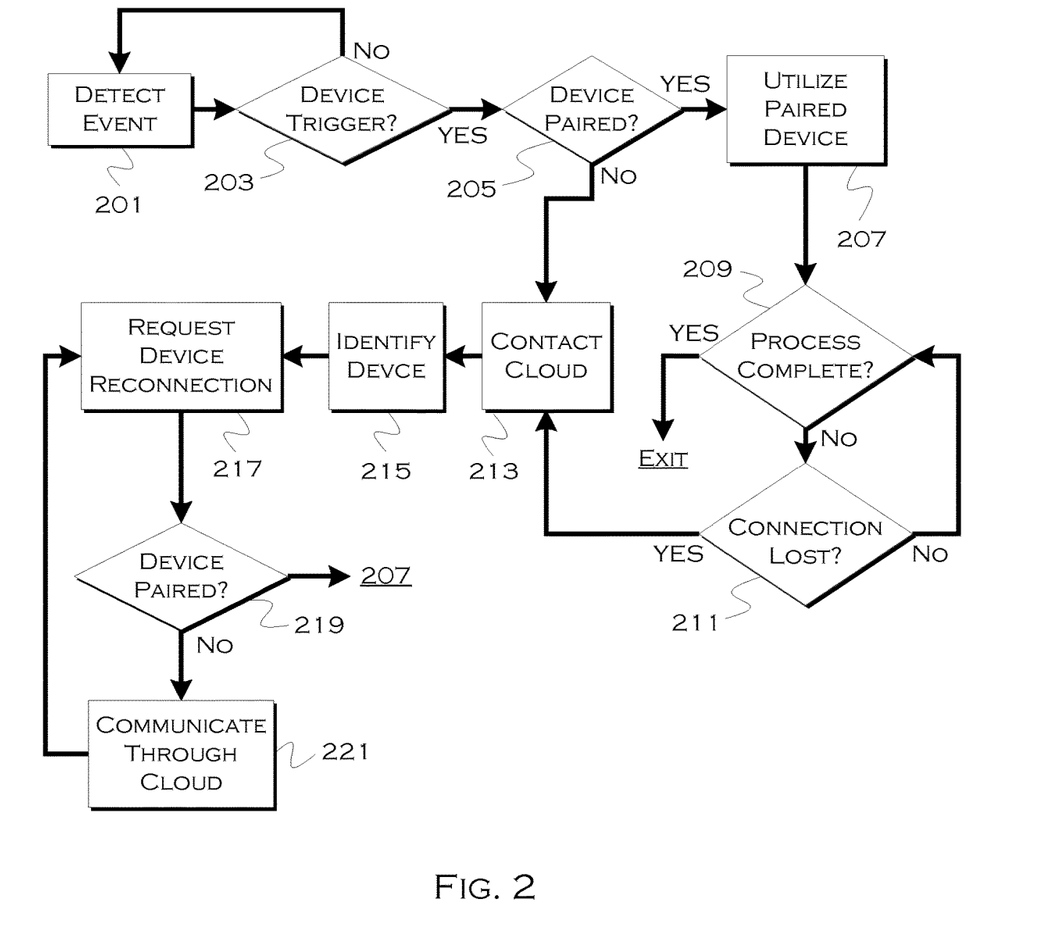
FIG. 2 shows an illustrative example of establishing cloud-assisted communication between a vehicle and a mobile device.

FIG. 2 shows an illustrative example of establishing cloud-based communication between a vehicle and mobile device. With respect to the illustrative embodiments described in this figure, it is noted that a general purpose processor may be temporarily enabled as a special purpose processor for the purpose of executing some or all of the representative methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process running on a vehicle detects that an event has occurred 201. The event will often be an event that might signal that device usage or pairing was desired (e.g., without limitation, opening a door, an emergency event, putting a vehicle in drive, sitting in a driver's seat, etc.) In some of these instances, the event may be initiated by the loss of connection to a paired device, and "completed" (triggered) by the occurring event. For example, a vehicle may commonly try to pair with a device when started. But, if a user leaves a vehicle running, and moves outside a connectable range (such that an existing connection is dropped), the user will not necessarily "restart" the vehicle upon return. In such a case, the door opening or closing or an occupant presence can be detected as a trigger to instruct the device to pair. Any suitable event to initiate remote communication could be used, however. In some examples, the vehicle "standard" pairing (such as, upon ignition) may not function because a device BLUETOOTH or other wireless connection is disabled. By sending an instruction to the device through the cloud, the device can be instructed to enable the appropriate functionality and pair.

In this example, once the event has been detected by or transmitted to an in-vehicle modem, the process determines if the event warrants a pairing request 203. Then, in this example, the system checks to see if a device is presently paired 205. If paired, the system may use any functionality provided to the device 207 (for example, if the functionality relates to handling the event, this can be performed via the paired device without the need to establish a connection to the device through the cloud). Since the device is paired, the system can also use the device connection, if desired to remotely log the event and perform any other necessary or desired steps with respect to the event. Until these processes are complete 209, the system continues to utilize the paired device.

If the connection to the paired device is lost 211, or if the paired device was never present in the first place 205, the process then communicates directly with the cloud (e.g., remote database, web service, etc.) via the on-board vehicle modem 213.

In this example, the vehicle may choose to identify the device previously paired 215, in case there is more than one device associated with a particular vehicle account. For example, a secondary phone may have been previously paired (in the walk-away and return example) and the pairing could be re-established with that device explicitly, instead of first trying to instruct a primary device (not present at the vehicle in this example) to pair.

The communication with the cloud can include a request for re-connection with a local device 217. In an alternative example, the mere fact that local communication with a local mobile/smart device is not yet established can cause the remote server or web service to attempt to initiate such communication through the cloud. The attempt to communicate can persist until a timeout occurs or communication is established 219 through pairing. In the meantime, any communication with the device from the vehicle can be facilitated in a cloud-assisted manner (e.g., the communication is relayed between the vehicle and the device).

Cloud-assisted communication can include, but is not limited to, communicating with applications on the device, utilizing device coordinates or accelerometer functions, utilizing device navigation capabilities, etc. Some, most, or all of the functionality commonly available to a driver/occupant when the device is locally directly connected (i.e., without the cloud intermediary) can be realized through the cloud-assisted communication. This can improve the driver experience and generally reduce driver frustration if seemingly every-day services or functionality appears to be missing from a vehicle due to a lack of local device connection (in this example, while the process waits for the device to re-pair).

Figure 3:
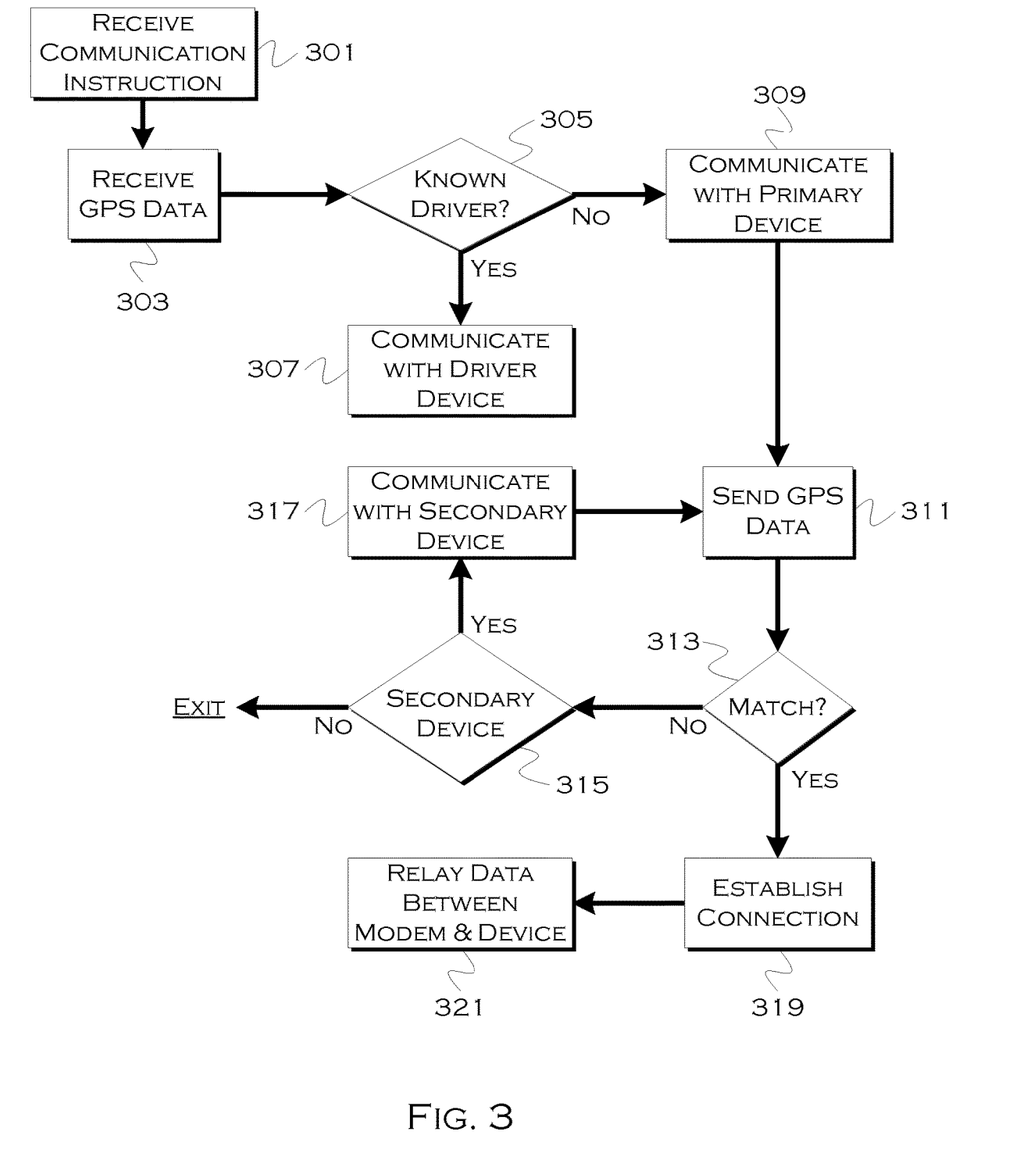
FIG. 3 shows an illustrative example of fulfilling a cloud-assisted connection request between a vehicle and a mobile device.

FIG. 3 shows an illustrative example of fulfilling a cloud-based connection request between a vehicle and a mobile device. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this example, a process engaged by a remote system (e.g., without limitation, database, web service, etc.) is shown for facilitating communication between an onboard modem and a mobile and/or smart device. Here, the process receives a communication instruction 301. This instruction could be transmitted by the onboard modem (asking for communication with the mobile device) or could be automatically generated upon receipt of information indicating a mobile device is not presently paired with a vehicle system.

Also, in this example, the process receives vehicle GPS coordinates if available 303. In this example, these coordinates are used to determine if a mobile device with which communication is requested is also present at the vehicle, although different confirmation methods could be used, if confirmation of the device being in the vehicle is even desired at all. The process will also receive information identifying the driver or another occupant, if available 305, again for the purposes of determining whether the device is in the vehicle, and so this information can be skipped if communication with the device regardless of in-vehicle presence is desired.

If the driver (or an occupant) is known 305, the process assumes that the driver (or occupant) device will be used as the mobile device 307, at least as a starting point for device communication (for example, if five devices are associated with an account, the system selects this device as the preferred device for this particular request). Otherwise, a device designated as a primary device will be used as a starting point 309.

It is possible to identify a driver and/or occupant through a variety of techniques (e.g., without limitation, driving style, seat settings, weight sensors, on-board cameras, explicit identification from driver/occupant, voice recognition, bio-metrics, etc.) If a driver identity is known, or an occupant identity is known, the system "assumes" that a phone corresponding to the identified party is likely present, and the identification of the party may be transmitted to the remote server to facilitate initial phone selection. Additionally or alternatively, a list of one or more previously paired or preferred devices could be transmitted to the remote server. This could include a presently input preferred device (i.e., driver or occupant indicates that they'd like to use the functionality of a particular device) or, for example, a previously stored list of previously paired devices.

Regardless of which device is chosen as an initial communication option in this process, a secondary check is made for the presence of the device in the vehicle. It is possible that in some embodiments a certain device is desired for usage regardless of in-vehicle device presence, but in this example the process attempts to find a device that is present in a vehicle. Accordingly, in this example, the process sends GPS data corresponding to the vehicle location to the selected initial device 311. This data is compared to device GPS data (if available), to determine if the device is actually at the same location as the vehicle. If there is not a match 313, the process will repeat for any secondary devices 315 associated with that particular vehicle. Communication with any number of secondary devices is attempted 317 and the same GPS correspondence check is made.

In this example, if there is no correlation between any device and the vehicle location, the process exits, although it is also possible to default to communication with a particular device if no devices appear to be in-vehicle, or to skip the correspondence-between-GPS check altogether. If a device does have coordinates that correspond to vehicle coordinates (i.e., a match) 313, the process establishes a connection with that device 321 and relays data and communication between the selected device and the vehicle onboard modem 323. This communication relay provides use of some or all of the device functionality to which a driver/occupant may be accustomed.

Figure 4:
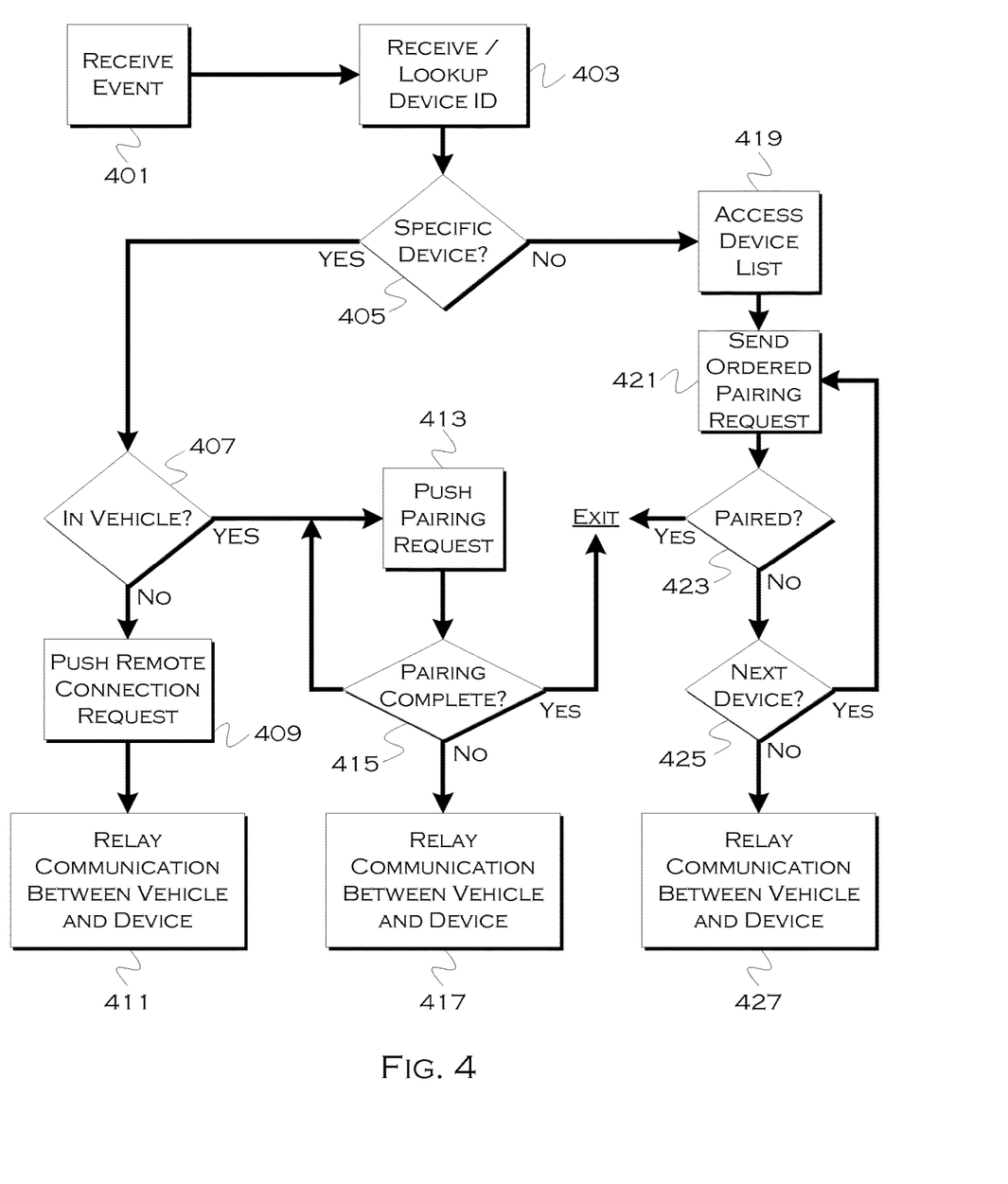
FIG. 4 shows another illustrative example of fulfilling a cloud-assisted request sent to a mobile device.

FIG. 4 shows another illustrative example of fulfilling a cloud-assisted request sent to a mobile device. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process running on a remote server can receive indicia of an event from the vehicle computer 401. This can be the aforementioned door opening, etc., or can be some other event that might trigger device communication requests. In this example, the remote system also receives a specific device ID (if a specific re-connection is desired) or a list of device IDs, or can look up devices associated with an account if no identification is provided 403.

If a specific device is identified 405, the process can determine if the device is in-vehicle (through a number of techniques, including comparing device location, checking to see if the device is receiving any signals from the vehicle computer, etc.). If the device is not in-vehicle 407, the process may push a request to the device to establish remote communication 409. This can be used for tracking events, for example, or for other information-providing events to a remote device.

For example, a parent may want to know when a teenage user exits a certain area or if the vehicle is in an accident. Upon GPS coordinates exiting a geo-fenced area, or upon the triggering of a vehicle restraint or accident-related system, the process can attempt to connect to the remote device. Then, communication from the vehicle can be relayed to the remote device 411 to update the remote device user (in this example, "remote device" means remote from the vehicle, as well as remote from the intervening server).

If the device is in the vehicle 407, the process can push a pairing request to the device 413. As previously noted, this can include a request to enable local wireless communication (e.g., BLUETOOTH) to facilitate pairing. Once pairing is complete 415, the device and vehicle computer can communicate locally. Until then, the cloud can assist with communication between the vehicle computer and the device 417.

In other instances of event triggers, the process may not identify a specific device 405. This could be, for example, because a specific device is unknown (such as when no previous pairing was present on a journey) or for any number of other reasons. In this example, the process may access a device list 419, provided by the vehicle computer or stored remote from the vehicle. In an ordered fashion, in this example, the process sends pairing requests to the various devices associated with the vehicle 421. This could include, for example, starting with a primary device, and working through secondary devices 425 until a device is successfully paired 423. If no pairing is possible, the cloud may assist with communication between the vehicle and one of the devices 427. In other examples, pairing instructions can be sent to all devices associated with an account, and the first device to pair will complete the pairing process.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that are not explicitly illustrated or described.

What is claimed is:

1. A system comprising:
a processor configured to:
receive a vehicle event;
based on occurrence of the vehicle event, communicate with a remote server through a vehicle modem, including transmission of a wireless device present connection state; and
request that the remote server instruct a wireless device to pair with a vehicle infotainment system if the wireless device present connection state indicates the wireless device is not presently paired.

2. The system of claim 1, wherein the processor is further configured to establish communication with the wireless device through the remote server if the wireless device present connection state indicates the wireless device is not presently connected to the vehicle infotainment system.

3. The system of claim 1, wherein the processor is configured to determine if the wireless device is wirelessly connected.

4. The system of claim 1, wherein the processor is configured to determine if the wireless device is connected in a wired manner.

5. The system of claim 1, wherein the processor is further configured to communicate an occupant identity with the remote server.

6. The system of claim 1, wherein the processor is further configured to communicate vehicle GPS coordinates with the remote server.

7. The system of claim 1, wherein the processor is further configured to communicate a preferred device identity with the remote server.

8. A computer-implemented method comprising:
determining a wireless device present connection state relative to a vehicle infotainment system based on receipt of a vehicle event;
communicating with a remote server through a vehicle modem, including sending the wireless device present connection state; and
requesting that a pairing instruction to pair with a vehicle computer be sent to a wireless device through the remote server.

9. The method of claim 8, further comprising determining if the wireless device is wirelessly connected.

10. The method of claim 8, further comprising determining if the wireless device is connected in a wired manner.

11. The method of claim 8, further comprising establishing communication with the wireless device through the remote server.

12. The method of claim 8, further comprising including an occupant identity as part of communication with the remote server.

13. The method of claim 8, further comprising including vehicle GPS coordinates as part of communication with the remote server.

14. The method of claim 8, further comprising including a preferred device identity as part of communication with the remote server.

* * * * *